United States Patent
Meng et al.

(10) Patent No.: US 9,723,486 B2
(45) Date of Patent: Aug. 1, 2017

(54) METHOD AND APPARATUS FOR ACCESSING NETWORK

(71) Applicant: Xiaomi Inc., Beijing (CN)

(72) Inventors: Deguo Meng, Beijing (CN); Yue Liang, Beijing (CN); Enxing Hou, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/007,648

(22) Filed: Jan. 27, 2016

(65) Prior Publication Data

US 2016/0227407 A1    Aug. 4, 2016

(30) Foreign Application Priority Data

Jan. 29, 2015 (CN) .......................... 2015 1 0047875

(51) Int. Cl.
| | |
|---|---|
| H04M 3/16 | (2006.01) |
| H04W 12/06 | (2009.01) |
| H04L 29/06 | (2006.01) |
| H04W 4/06 | (2009.01) |
| H04W 48/08 | (2009.01) |
| H04W 84/12 | (2009.01) |
| H04L 12/18 | (2006.01) |

(52) U.S. Cl.
CPC ........... *H04W 12/06* (2013.01); *H04L 63/083* (2013.01); *H04W 4/06* (2013.01); *H04W 48/08* (2013.01); *H04L 12/189* (2013.01); *H04W 84/12* (2013.01)

(58) Field of Classification Search
CPC ....... H04W 12/06; H04W 8/245; H04W 4/12; H04M 1/72519

USPC ........................... 455/411, 412.1, 550.1, 418
See application file for complete search history.

(56) References Cited

U.S. PATENT DOCUMENTS

| 7,835,355 | B2 * | 11/2010 | Miyata ................ H04L 12/5692 370/389 |
|---|---|---|---|
| 9,058,144 | B2 * | 6/2015 | Sugimoto .......... H04N 1/00214 |
| 2006/0126668 | A1 * | 6/2006 | Kwon ..................... H04H 20/82 370/486 |
| 2006/0221919 | A1 | 10/2006 | McRae et al. |

(Continued)

FOREIGN PATENT DOCUMENTS

| CN | 103152801 A | 6/2013 |
|---|---|---|
| CN | 103825788 A | 5/2014 |

(Continued)

OTHER PUBLICATIONS

International Search Report dated Jan. 21, 2016 for International Application No. PCT/CN2015/093067, 4 pages.

(Continued)

*Primary Examiner* — Danh Le
(74) *Attorney, Agent, or Firm* — Brinks, Gilson & Lione

(57) ABSTRACT

A method for providing access information for accessing a network device from a first terminal to a second terminal includes obtaining, by a first terminal, access information instructing a second terminal to access the network, the access information including a service set identifier SSID and an access password, selecting a plurality of destination addresses including the access information from a designated multicast address segment, and multicasting a plurality of user datagram protocol (UDP) multicast messages including the plurality of destination addresses to the second terminal.

12 Claims, 10 Drawing Sheets

(56) References Cited

U.S. PATENT DOCUMENTS

| | | | |
|---|---|---|---|
| 2012/0207075 A1 | 8/2012 | Nagaraj et al. | |
| 2013/0103807 A1 | 4/2013 | Couto et al. | |
| 2014/0007209 A1 | 1/2014 | Zucker | |
| 2014/0186049 A1* | 7/2014 | Oshima | H04B 10/1143 398/118 |
| 2014/0229387 A1* | 8/2014 | Chow | G06Q 20/3829 705/71 |
| 2015/0195137 A1* | 7/2015 | Kashyap | H04L 41/0893 370/254 |
| 2015/0312945 A1* | 10/2015 | Park | H04W 12/04 370/338 |
| 2016/0227596 A1* | 8/2016 | Otani | H04N 5/23206 |

FOREIGN PATENT DOCUMENTS

| | | |
|---|---|---|
| CN | 104113934 A | 10/2014 |
| CN | 104144034 A | 11/2014 |
| CN | 104378801 A | 2/2015 |
| CN | 104410970 A | 3/2015 |
| CN | 104837178 A | 8/2015 |
| JP | 2004-173260 A | 6/2004 |
| JP | 2006-185124 A | 7/2006 |
| JP | 2006-285826 A | 10/2006 |
| JP | 2011-044823 A | 3/2011 |
| JP | 2014-183445 A | 9/2014 |
| KR | 10-2003-0046661 A | 6/2003 |
| KR | 10-2013-0080487 A | 7/2013 |
| KR | 10-2015-0006289 A | 1/2015 |
| RU | 2 292 648 C2 | 1/2007 |
| WO | WO 2011/043756 A1 | 4/2011 |
| WO | WO 2011/120184 A1 | 10/2011 |
| WO | WO 2013/179092 A1 | 12/2013 |

OTHER PUBLICATIONS

Office Action dated Oct. 17, 2016 for Korean Application No. 10-2015-7036664, 7 pages.
English Translation of International Search Report dated Jan. 21, 2016 for International Application No. PCT/CN2015/093067, 2 pages.
Extended European Search Report dated May 31, 2016 for European Application No. 16153002.7, 9 pages.
Microsoft, "Web Services on Devices," A Windows® Rally™ White Paper, Microsoft Corporation, Dec. 13, 2016, 36 pages.
Notice of Allowance dated Apr. 18, 2017 for Japanese Application No. 2016-571462, 3 pages.
Office Action dated May 12, 2017 for Russian Application No. 2016111372/08, 11 pages.

* cited by examiner

METHOD AND APPARATUS FOR ACCESSING NETWORK

CROSS-REFERENCE TO RELATED APPLICATIONS

This application is based upon and claims priority to Chinese Patent Application 201510047875.1, filed on Jan. 29, 2015, the entire contents of which are incorporated herein by reference.

TECHNICAL FIELD

The present disclosure relates to communication technology, and more particularly, to a method and an apparatus for accessing a network.

BACKGROUND

With the development of communication technology, more and more users access a wireless network of a network access device via terminals with wireless connection module, so as to access the network via the network access device.

A process for configuring the terminal to access the wireless network of the network access device is described as follow. Firstly, the terminal, by detecting an access signal broadcasted by the network access device existed in the current environment, generates a list of network access devices after receiving the access signals broadcasted by respective access devices. The user selects a network access device to be accessed in the list and enters a password. At this time, the terminal transmits an identify request carrying the password to the selected network access device. The network access device records the terminal as an identified device after verifying the password, and returns an authentication answer of passing the authentication to the terminal. The terminal transmits a connection establishing request to the network access device after receiving the authentication answer. The network access device will make the terminal access the wireless network according to the request.

SUMMARY

The embodiment of the present disclosure provides a method and apparatus for accessing the network. The technical solution is as below.

According to a first aspect of embodiments of the present disclosure, there is provided a method for providing access information for accessing a network device from a first terminal to a second terminal, including obtaining, by the first terminal, access information instructing a second terminal to access the network device, the access information including a service set identifier (SSID) and a password for the network device, dividing, by the first terminal, the access information into a plurality of data units, selecting, by the first terminal, a plurality of destination addresses including the access information from a designated multicast address segment associated with the first terminal, the plurality of data units being included into the plurality of the destination addresses, and multicasting, by the first terminal, a plurality of user datagram protocol user datagram protocol (UDP) multicast messages including the plurality of destination addresses to the second terminal.

According to a second aspect of the embodiment of the present disclosure, provided is a method for accessing a network device from a terminal, including monitoring, by the terminal, a designated multicast address segment, obtaining, by the terminal, destination addresses of a plurality of UDP multicast messages when the plurality of UDP multicast messages are received for the designated multicast address segment, parsing, the terminal, the destination addresses of the plurality of the UDP multicast messages to obtain access information, the access information including an SSID and a password for the network device, and accessing, by the terminal, the network device based on the SSID and the password.

According to a third aspect of the embodiment of the present disclosure, provided is an apparatus for accessing a network device, including a first obtaining module, configured to obtain access information instructing a second terminal to access the network, the access information including a service set identifier (SSID) and a password for the network device, a selection module configured to select a plurality of destination addresses including the access information from a designated multicast address segment, and a multicasting module configured to multicast a plurality of user datagram protocol UDP multicast messages including the plurality of destination addresses to the second terminal.

According to the fourth aspect of the embodiment of the present disclosure, provided is an apparatus for accessing a network device, including a monitoring module configured to monitor a designated multicast address segment, an acquiring module configured to acquire destination addresses of a plurality of UDP multicast messages when the plurality of UDP multicast messages are received for the designated multicast address segment, a parsing module configured to parse the acquired destination addresses of the plurality of the UDP multicast messages to obtain access information, the access information including an SSID and a password for the network device, and an access module configured to perform a process of accessing the network device based on the SSID and the password.

According to the fifth aspect of the embodiment of the present disclosure, provided is an apparatus for accessing a network device, including a processor, and a memory for storing instructions executable by the processor. The processor is configured to perform obtaining access information instructing a second terminal to access the network, the access information including a service set identifier (SSID) and a password for the network device, selecting a plurality of destination addresses including the access information from a designated multicast address segment, and multicasting a plurality of user datagram protocol UDP multicast messages including the plurality of the destination addresses to the second terminal.

According to the sixth aspect of the embodiment of the present disclosure, provided is an apparatus for accessing a network device, including a processor, and a memory for storing instructions executable by the processor. The processor is configured to perform monitoring a designated multicast address segment, acquiring destination addresses of a plurality of UDP multicast messages when the plurality of UDP multicast messages are received for the designated multicast address segment, parsing the acquired destination addresses of the plurality of the UDP multicast messages to obtain access information, the access information including an SSID and a password, and performing a process of accessing the network device based on the SSID and the password.

According to the seventh aspect of the embodiment of the present disclosure, provided is a non-transitory computer-readable storage medium storing instructions that, when being executed by a processor of a device, cause the device to perform obtaining access information instructing a second terminal to access a network device, the access information comprising a service set identifier (SSID) and a password for the network device, selecting a plurality of destination addresses comprising the access information from a designated multicast address segment associated with the first terminal, and multicasting a plurality of UDP multicast messages including the plurality of destination addresses to the second terminal.

According to the eighth aspect of the embodiment of the present disclosure, provided is a non-transitory computer-readable storage medium storing instructions that, when being executed by a processor of a device, cause the device to perform monitoring a designated multicast address segment, acquiring destination addresses of a plurality of UDP multicast messages when the plurality of UDP multicast messages are received for the designated multicast address segment, parsing the acquired destination addresses to obtain access information, the access information comprising an SSID and a password for the network device, and performing a process of accessing the network device based on the SSID and the password.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

In order to further clarify the objects, technical solutions and advantages of the present disclosure, the embodiments of the present disclosure are described in further detail with reference to the drawings hereinafter.

Figure 1:
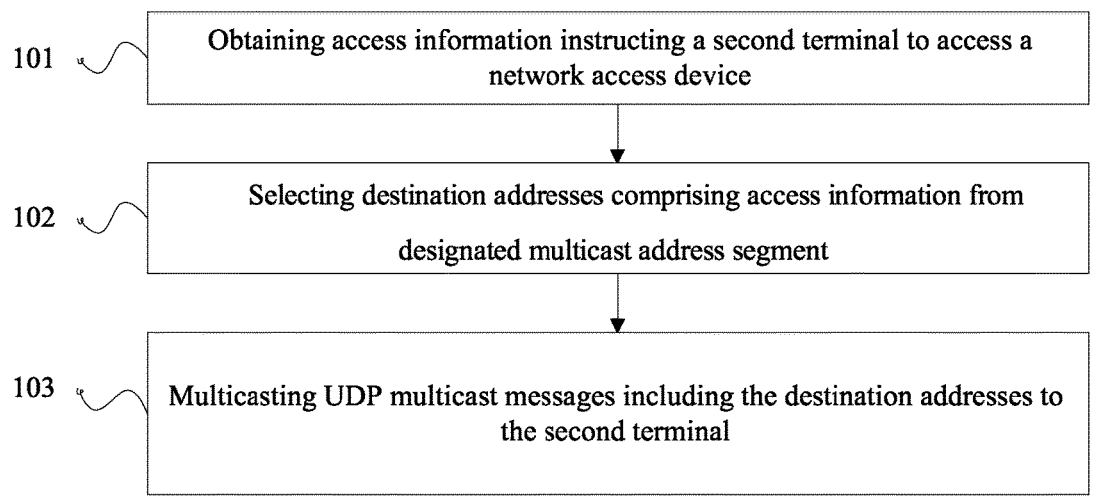
FIG. 1 is a flow chart showing a method for accessing a network, according an exemplary embodiment.

An embodiment of the present disclosure provides a method for accessing a network access device applied in a terminal. Referring FIG. 1, the method includes the steps as follow.

In step 101, a first terminal obtains access information instructing a second terminal to access the network access device. The access information includes a service set identifier (SSID) and an access password for the network access device. In step 102, a plurality of destination addresses including the access information are selected from a designated multicast address segment. In step 103, a plurality of user datagram protocol (UDP) multicast messages including the plurality of destination addresses are multicast to the second terminal.

In the embodiment of the present disclosure, the first terminal stores the access information instructing the second terminal to access the network into a plurality of multicast addresses, and transmits the plurality of multicast addresses to the second terminal by multicasting. A convenient access to the network by the second terminal is realized, thereby avoiding the defect of low human-computer interactivity due to complex operations, thus increasing network access efficiency.

Figure 2:
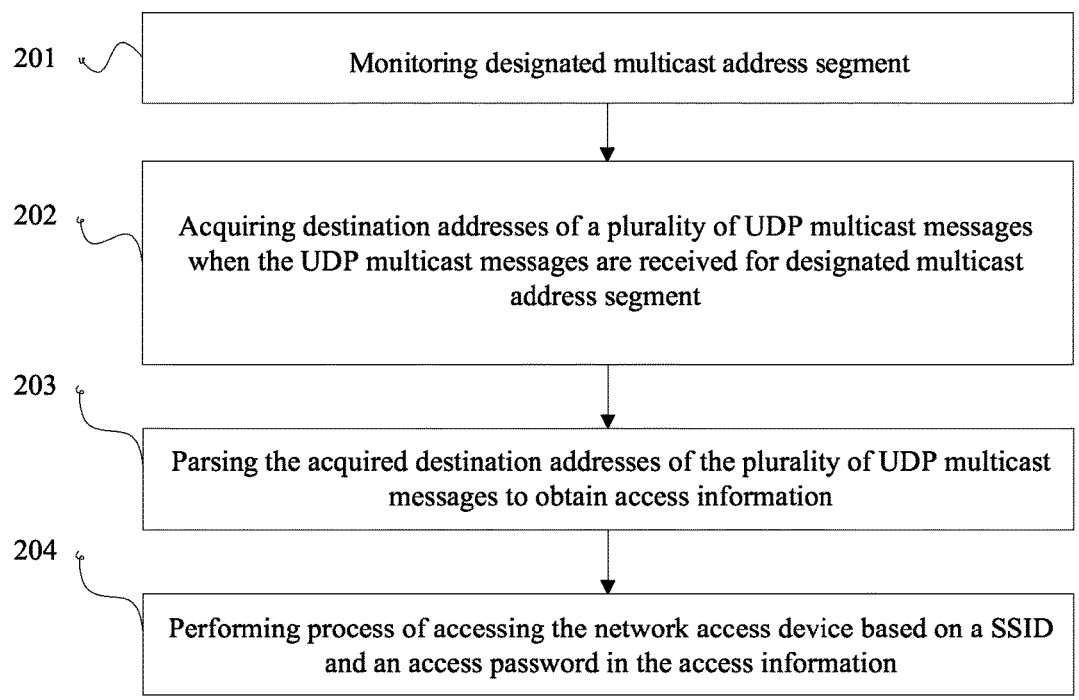
FIG. 2 is a flow chart showing a method for accessing a network, according an exemplary embodiment.

Another exemplary embodiment of the present disclosure provides a method for accessing a network applied in a terminal. Referring FIG. 2, the method includes the steps as follow.

In step 201, the second terminal monitors a designated multicast address segment. In step 202, destination addresses of a plurality of UDP multicast messages are acquired when the plurality of UDP multicast messages are received for the designated multicast address segment.

In step 203, the acquired destination addresses are parsed to obtain access information including an SSID and an access password for the network access device.

In step 204, a process of accessing the network access device corresponding to the SSID is performed based on the SSID and the access password.

In the embodiment of the present disclosure, the second terminal monitors the designated multicast address segment, restores the access information according to the field of the multicast address of each multicast message after receiving the plurality of multicast message from the designated multicast address segment, and performs the operation of accessing the network according to the access information. A convenient access to the network by the second terminal is realized, thereby avoiding the defect of low human-computer interactivity due to complex operations, thus increasing network access efficiency.

Figure 3:
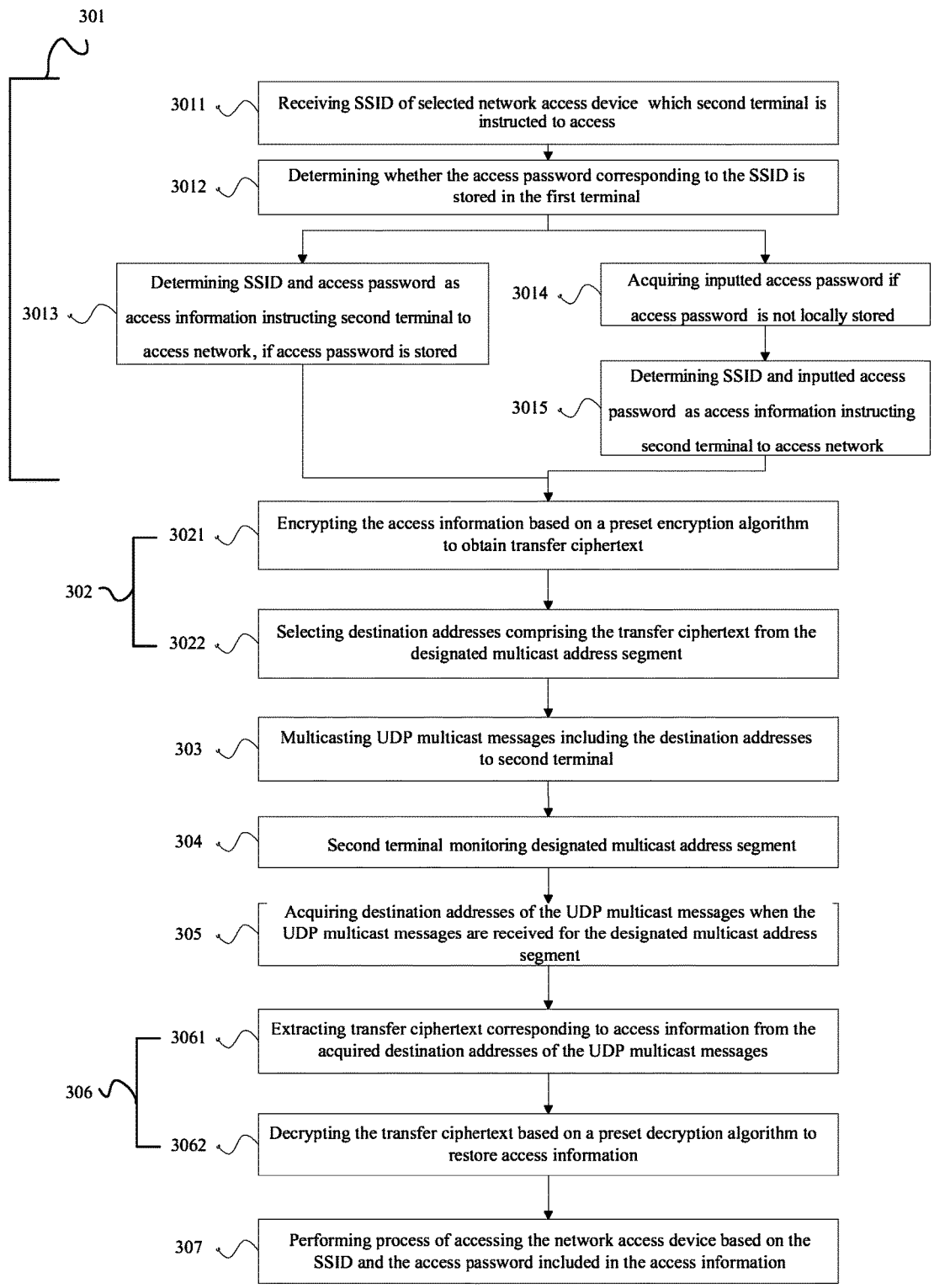
FIG. 3 is a flow chart showing a method for accessing a network, according an exemplary embodiment.

Referring to FIG. 3, another exemplary embodiment of the present disclosure provides a method for accessing a network access device.

It should be noted that the second terminal of the embodiment of the present disclosure may be one or more smart terminals that are going to access the network. The second terminal may be smart terminals such as smart phones, tablet computers and the like, and may also be smart terminals without an input device such as wearable smart device, smart home appliances and the like. The first terminal may be devices such as a cell phone and a tablet computer installed with smart home apps.

Herein, the process of the method includes the steps as follow.

In step 301, the first terminal obtains access information instructing the second terminal to access the network. The access information includes a service set identifier SSID and an access password for the network access device.

Herein, the present step may be triggered in the smart home apps of the first terminal. After turning on each of the second terminals, the user configures the second terminals to enter a network access mode. Thereafter, the user operates the first terminal to run the smart home apps, and at this time, the first terminal begins to search for network access devices in the current environment and generates a list of network access devices. Herein, the list of network access devices includes at least SSIDs (service set identifier) corresponding to each of the network access devices. The user is required to select one network access device from the list of network access devices, so as to instruct the second terminal to access the selected network access device.

Correspondingly, the step 301 may be implemented by the flowing steps.

In step 3011, an SSID of the selected network accessing device which the second terminal is instructed to access, is received. In this step, after the user makes a selection in the above list of network access devices, the SSID of the selected network accessing device which the second terminal is instructed to access is obtained from the list of network access devices.

In step 3012, it is determined whether an access password corresponding to the SSID is locally stored in the first terminal.

If the first terminal has accessed the selected network accessing device which the second terminal is instructed to access before, the SSID and the access password corresponding to the network access device may be stored in the first terminal. Accordingly, in the correspondence between SSIDs and access passwords locally stored in the first terminal, it is possible to determine whether a record corresponding to the SSID exists according to the SSID corresponding to the selected network accessing device which the second terminal is instructed to access.

If the record is locally stored in the first terminal, step 3013 is performed. Otherwise, step 3014 is performed.

In step 3013, if an access password corresponding to the SSID is stored, the SSID and the password corresponding to the SSID are determined as the access information instructing the second terminal to access the network.

In step 3014, if no access password corresponding to the SSID is stored, an imputed access password corresponding to the SSID is acquired. If no record is found in the correspondence between SSIDs and access passwords locally stored in the first terminal, a prompt is popped to the user for a password input operation, and the inputted access password is received after the user inputs the access password and clicks a submit button.

In step 3015, the SSID and the inputted access password corresponding to the SSID are determined as the access information instructing the second terminal to access the network.

In step 302, a plurality of destination addresses including the access information are selected from the designated multicast address segment.

Herein, the present step may be performed by the steps as follow.

In step 3021, an encryption calculation is performed on the access information according to a preset algorithm, and a transfer ciphertext corresponding to the access information is obtained. Herein, the transfer ciphertext is a data string of numbers having a specified length.

In step 3022, a plurality of destination addresses including the transfer ciphertext are selected from the designated multicast address segment.

In the embodiment of the present disclosure, an encrypted transfer ciphertext is carried in the destination addresses of a plurality of UDP (User Datagram Protocol) multicast message, instead of transferring a content using the data content of the UDP multicast message.

Herein, the last two bytes of the selected destination address are selected to carry the encrypted transfer ciphertext. That is, the first two bytes of the destination address are predetermined, the last two bytes are selected according to the generated transfer ciphertext, and the final determined destination address is the destination address for the multicasting. The content of the field of the destination address of the UDP multicast message is limited, i.e., only four bytes of the destination IP (Internet Protocol) address may be stored. However, the transfer ciphertext that needs to be transmitted is far larger than four bytes. Thus, the transfer ciphertext is divided into a plurality of two byte segments and spread over the destination addresses of a plurality of UDP multicast messages. That is, each of the selected destination addresses includes a portion of the transfer ciphertext.

Herein, the multicast transfer is carried out using the private class D address in the IP (Internet Protocol) address, which includes a plurality of IP addresses as the multicast address for the multicast transferring. Optionally, 224.236.0.0-224.236.255.255 is selected as the designated multicast address segment. Herein, 224.236 is used as the first two bytes of the destination address according to the embodiment of the present disclosure.

The process for selecting the destination address according to the transfer ciphertext is: dividing the transfer ciphertext according to a preset bit number; obtaining a plurality of data segments; successively selecting two data segments to fill the last two bytes of the destination address; and generating a destination address.

Alternatively, before generating the destination address including the transfer ciphertext, a plurality of destination addresses including relevant information of the transfer ciphertext are generated. Herein, the relevant information may include but not limited to length of the transfer chipertext, data amount, and the like. Herein, a preset algorithm is performed on the relevant information to obtain the transfer chipertext corresponding to the relevant information, and the corresponding destination address is selected according to the transfer chipertext corresponding to the relevant information.

In step 303, according to the plurality of destination addresses, the user datagram protocol UDP multicast message is multicast to the second terminal.

According to the selected plurality of destination addresses, a plurality of UDP multicast messages are generated and the generated plurality of UPD multicast messages are successively transferred.

In step 304, the second terminal monitors a designated multicast address segment. The access information may be multicast via one or more multicast addresses, thus the second terminal is required to monitor the plurality of multicast addresses that are multicasting. Correspondingly, when the user actives the network access mode of the second terminal, the second terminal monitors the designated multicast address segment.

In the embodiment of the present disclosure, one or more second terminals may be included. Each of the second terminals may perform the process from step 304 to step 307 if there are a plurality of second terminals.

In step 305, if a plurality of UDP multicast messages are received for the designated multicast address segment, a destination address of each UDP multicast message is acquired.

In step 306, access information is parsed according to the acquired destination address of each UDP multicast message. The access information includes an SSID and an access password.

Herein, the present step may be performed by the steps as follow.

In step 3061, a transfer ciphertext corresponding to the access information is extracted according to the acquired destination address of each UDP multicast message. Herein, according to the sequence of the received UDP multicast messages, the last two bytes of the destination addresses are successively extracted, and the extracted contents are combined as the transfer ciphertext corresponding to the access information.

In step 3062, a decryption calculation is performed according to a preset algorithm, thereby restoring the access information.

In step 307, according to the SSID and the access password, a process of accessing the network access device corresponding to the SSID is performed.

Herein, the process of accessing the network is: generating an identifying request according to the SSID and the access password; transferring the identifying request to the network access device corresponding to the SSID; after passing the authentication, the network access device returning to the second terminal a authentication answer of passing the authentication; after receiving the authentication answer, the second terminal transferring to the network access device a request of establishing connection; and the network access device making the second terminal access the wireless network according to the request.

Figure 4:
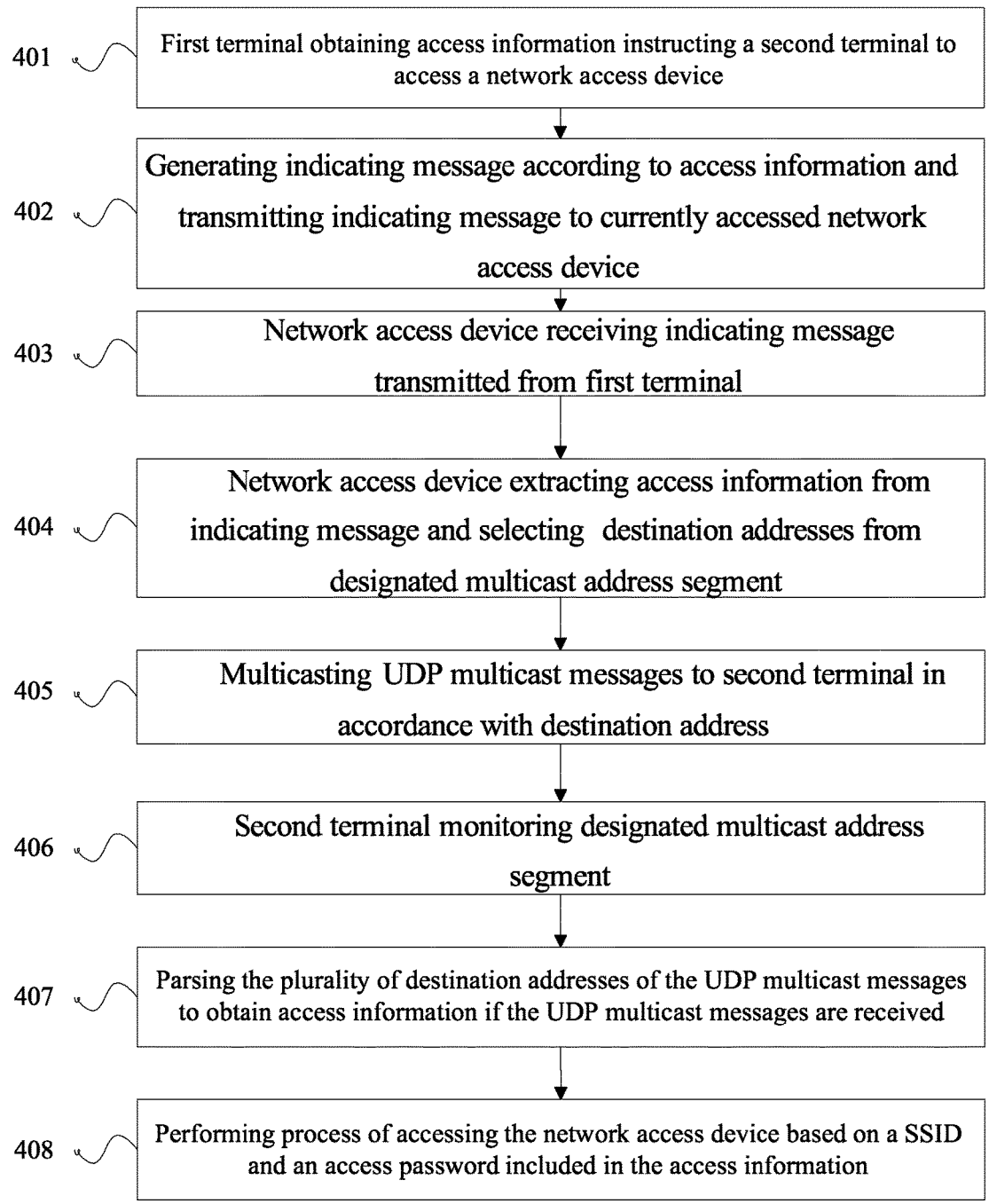
FIG. 4 is a flow chart showing a method for accessing a network, according an exemplary embodiment.

Referring to FIG. 4, another exemplary embodiment of the present disclosure provides a method for accessing the network.

In step 401, a first terminal acquires access information instructing a second terminal to access the network. The access information includes a service set identifier SSID and an access password. Herein, the process for acquiring the access information instructing the second terminal to access the network in this step is identical to that described in step 301, thus redundant description is omitted.

In step 402, an indicating message is generated according to the access information, and the indicating message is transmitted to the currently accessed network access device, such that the network access device performs the steps of selecting the plurality of destination addresses including the access information from the designated multicast address segment according to the indicating message and multicasting the plurality of UDP multicast messages to the second terminal in accordance with the plurality of destination addresses.

In step 403, the network access device receives the indicating message transmitted from the first terminal.

In step 404, the network access device extracts the access information from the indicating message, and selects a plurality of destination addresses containing the access information from the designated multicast address segment. The process in this step is identical to that described in step 302, thus redundant description is omitted.

In step 405, according to the plurality of destination addresses, user datagram protocol UDP multicast messages are multicast to the second terminal.

In step 406, the second terminal monitors a designated multicast address segment.

In step 407, if UDP multicast messages are received for the designated multicast address segment, the plurality of destination addresses of the UDP multicast messages are parsed to obtain the access information including SSID and the access password.

In step 408, the second terminal performs a process of accessing the network access device based on the SSID and the access password. The process of the present step is identical to that described in step 307, thus redundant description is omitted.

In the embodiment of the present embodiment, the first terminal divides and stores the access information instructing the second terminal to access the network into a plurality of multicast addresses including the access information, and transmits it to the second terminal by multicasting. A convenient access to the network by the second terminal is realized, thereby avoiding the defect of low human-computer interactivity due to complex operations, thus increasing network access efficiency.

Furthermore, the second terminal monitors the designated multicast address segment, restores the access information according to the field of the multicast address of each multicast message after receiving the plurality of multicast message from the designated multicast address segment, and performs the operation of accessing the network according to the access information. A convenient access to the network by the second terminal is realized, thereby avoiding the defect of low human-computer interactivity due to complex operations, thus increasing network access efficiency.

Figure 5:
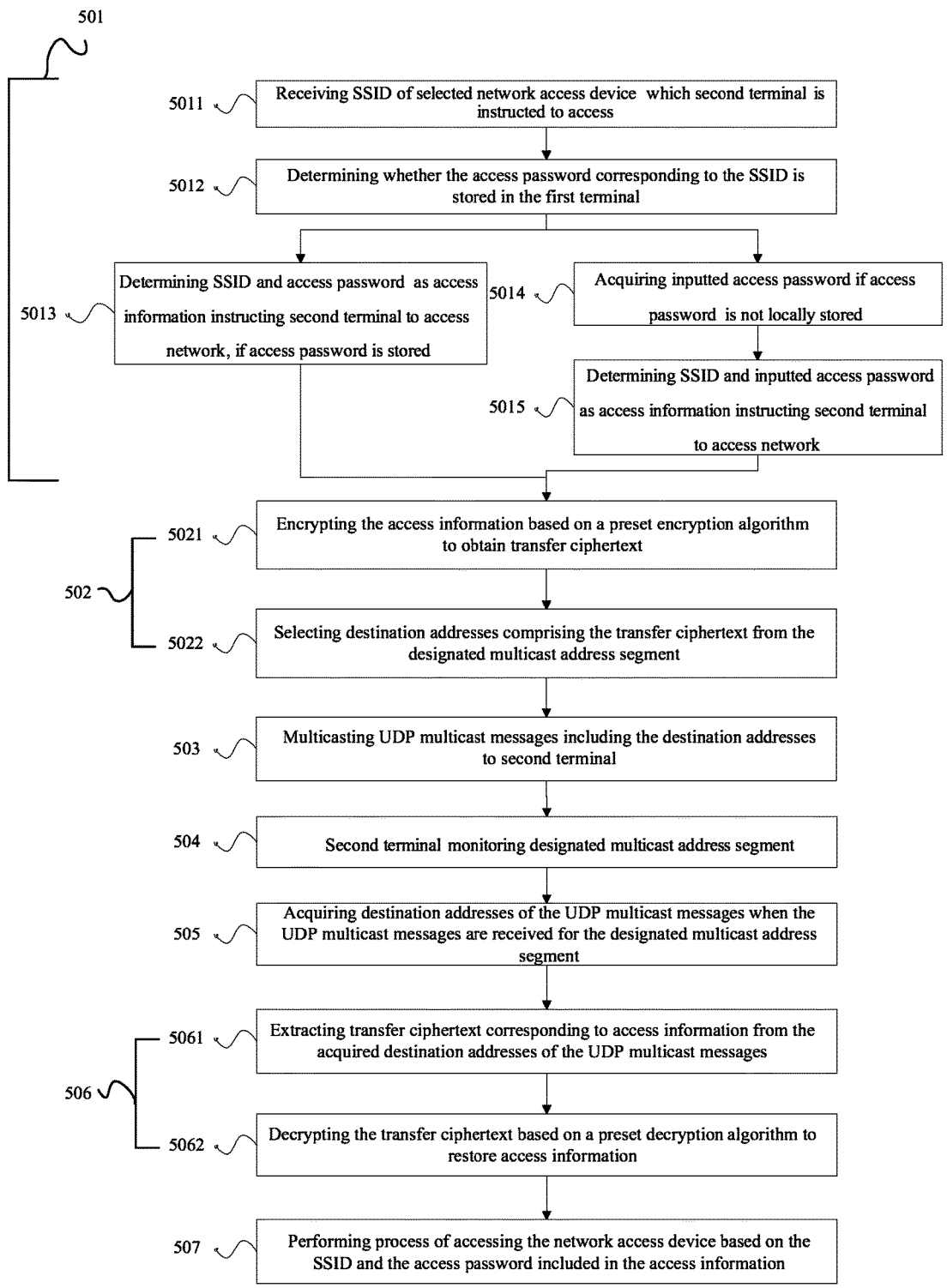
FIG. 5 is a flow chart showing a method for accessing a network, according an exemplary embodiment.

Referring to FIG. 5, another exemplary embodiment of the present disclosure provides a method for accessing the network.

It should be noted that, in the embodiments of the present disclosure, the second terminal may be one or more smart terminals that are going to access the network. The second terminal may be smart terminals such as smart phones, tablet computers and the like, and may also be smart terminals without an input device such as wearable smart device, smart home appliances and the like. The first terminal may be devices such as a cell phone and a tablet computer installed with smart home apps.

Herein, a process of the method includes the steps as follow.

In step 501, the first terminal acquires access information instructing the second terminal to access the network, and the access information includes a service set identifier (SSID) and an access password.

Herein, the present step may be triggered in the smart home apps of the first terminal. After turning on each of the second terminals, the user configures the second terminals to enter a network access mode. Thereafter, the user operates the first terminal to run the smart home apps, and at this time, the first terminal begins to search network access devices in the current environment and generates a list of network access devices. Herein, the list of network access devices includes at least SSIDs corresponding to each of the network access devices. The user is required to select one network access device form the list of network access devices, so as to instruct the second terminal to access the selected network access device.

Herein, since the first terminal is a network access device, the generated list of the network access devices may include its own SSID.

Correspondingly, step 501 may be performed by the steps as follow.

In step 5011, receiving an SSID of the selected network accessing device which the second terminal is instructed to access.

In this step, after the user makes a selection in the above list of network access devices, the SSID of the selected network accessing device which the second terminal is instructed to access is obtained from the list of network access devices.

In step 5012, determining whether an access password corresponding to the SSID is locally stored.

If the first terminal accessed the selected network accessing device which the second terminal is instructed to access before, the SSID and the access password corresponding to the network access device may be stored in the first terminal. Accordingly, in the correspondence between SSIDs and access passwords locally stored in the first terminal, it is possible to determine whether a record corresponding to the SSID exists according to the SSID corresponding to the selected network accessing device which the second terminal is instructed to access.

If the record is stored locally, step 5013 is performed. Otherwise, step 5014 is performed.

In step 5013, if an access password corresponding to the SSID is stored, the SSID and the password corresponding to the SSID are determined as the access information instructing the second terminal to access the network.

In step 5014, if no access password corresponding to the SSID is stored, an imputed access password corresponding to the SSID is acquired.

If no record is found in the correspondence between SSIDs and access passwords locally stored in the first terminal, a prompt is popped to the user for a password input operation, and the inputted access password is acquired after the user inputs the access password and clicks a submit button.

In step 5015, the SSID and the inputted access password corresponding to the SSID are determined as the access information instructing the second terminal to access the network.

In step 502, a plurality of destination addressees including the access information are selected from the designated multicast address segment. Herein, the present step may be performed by the steps as follow.

In step 5021, an encryption calculation is performed on the access information according to a preset algorithm, and a transfer ciphertext corresponding to the access information is obtained.

In step 5022, a plurality of destination addresses including the transfer ciphertext are selected, according to the transfer ciphertext, in the designated multicast address segment.

In the embodiment of the present disclosure, an encrypted transfer ciphertext is carried in the destination addresses of a plurality of UDP (User Datagram Protocol) multicast message, instead of being transferred in the data content of the UDP multicast message.

Herein, the last two bytes of the selected destination address are selected to carry the encrypted transfer ciphertext. That is, the first two bytes of the destination address are predetermined, the last two bytes are selected according to the generated transfer ciphertext, and the final determined destination address is the destination address for the multicasting. The content of the field of the destination address of the UDP multicast message is limited, i.e., only four bytes of the destination IP (Internet Protocol) address may be stored. However, the transfer ciphertext that needs to be transmitted is far larger than four bytes. Therefore, the transfer ciphertext is divided into a plurality of two byte segments and spread over the destination addresses of a plurality of UDP multicast messages. Each of the selected destination addresses includes a portion of the transfer ciphertext.

Herein, the multicast transfer is carried out using the private class D address in the IP (Internet Protocol) address, which includes a plurality of IP addresses as the multicast address for the multicast transferring. Optionally, 224.236.0.0-224.236.255.255 is selected as the designated multicast address segment. Herein, 224.236 is used as the first two bytes of the destination address according to the embodiment of the present disclosure.

The process for selecting the destination address according to the transfer ciphertext is: dividing the transfer ciphertext according to a preset bit number; obtaining a plurality of data segments; successively selecting two data segments to fill the last two bytes of the destination address; and generating a destination address.

Alternatively, before generating the destination address including the transfer ciphertext, a plurality of destination addresses including relevant information of the transfer ciphertext are generated. Herein, the relevant information may include but not limited to length of the transfer chipertext, data amount, and the like. Herein, a preset algorithm is performed on the relevant information to obtain the transfer chipertext corresponding to the relevant information, and the corresponding destination address is selected according to the transfer chipertext corresponding to the relevant information.

In step 503, according to the plurality of destination addresses, the user datagram protocol (UDP) multicast message is multicast to the second terminal. Based on the selected plurality of destination addresses, a plurality of UDP multicast messages are generated and the generated plurality of UPD multicast messages are successively transferred.

In step 504, the second terminal monitors a designated multicast address segment. The access information may be multicast via one or more multicast addresses, thus the second terminal is required to monitor the plurality of multicast addresses that are multicasting. Correspondingly, when the user actives the network access mode of the second terminal, the second terminal monitors the designated multicast address segment.

In the embodiment of the present disclosure, one or more second terminals may be included. Each of the second terminals may perform the process from step 504 to step 507 if there are a plurality of second terminals.

In step 505, if a plurality of UDP multicast messages are received for the designated multicast address segment, a destination address of each UDP multicast message is acquired.

In step 506, access information is parsed according to the acquired destination address of each UDP multicast message. The access information includes an SSID and an access password. Herein, the present step may be performed by the steps as follow.

In step 5061, a transfer ciphertext corresponding to the access information is extracted from the acquired destination address of each UDP multicast message. Specifically, according to the sequence of the received UDP multicast messages, the last two bytes of the destination addresses are successively extracted, and the extracted contents are combined as the transfer ciphertext corresponding to the access information.

In step 5062, a decryption calculation is performed according to a preset algorithm, thereby restoring the access information.

In step 507, according to the SSID and the access password, a process of accessing the network access device corresponding to the SSID is performed.

Herein, the process of accessing the network is: generating an identifying request according to the SSID and the access password; transferring the identifying request to the network access device corresponding to the SSID; after passing the authentication, the network access device returning to the second terminal a authentication answer of passing the authentication; after receiving the authentication answer, the second terminal transferring to the network access device a request of establishing connection; and the network access device making the second terminal access the wireless network according to the request.

In the embodiment of the present disclosure, the first terminal stores the access information instructing the second terminal to access the network into a plurality of multicast addresses including the access information, and transmits it to the second terminal by multicasting. A convenient access to the network by the second terminal is realized, thereby avoiding the defect of low human-computer interactivity due to complex operations, thus increasing network access efficiency.

In addition, the second terminal monitors the designated multicast address segment, restores the access information based on the field of the multicast address of each multicast message after receiving the plurality of multicast message from the designated multicast address segment, and performs the operation of accessing the network according to the access information. A convenient access to the network by the second terminal is realized, thereby avoiding the defect of low human-computer interactivity due to complex operations, thus increasing network access efficiency.

Figure 6:
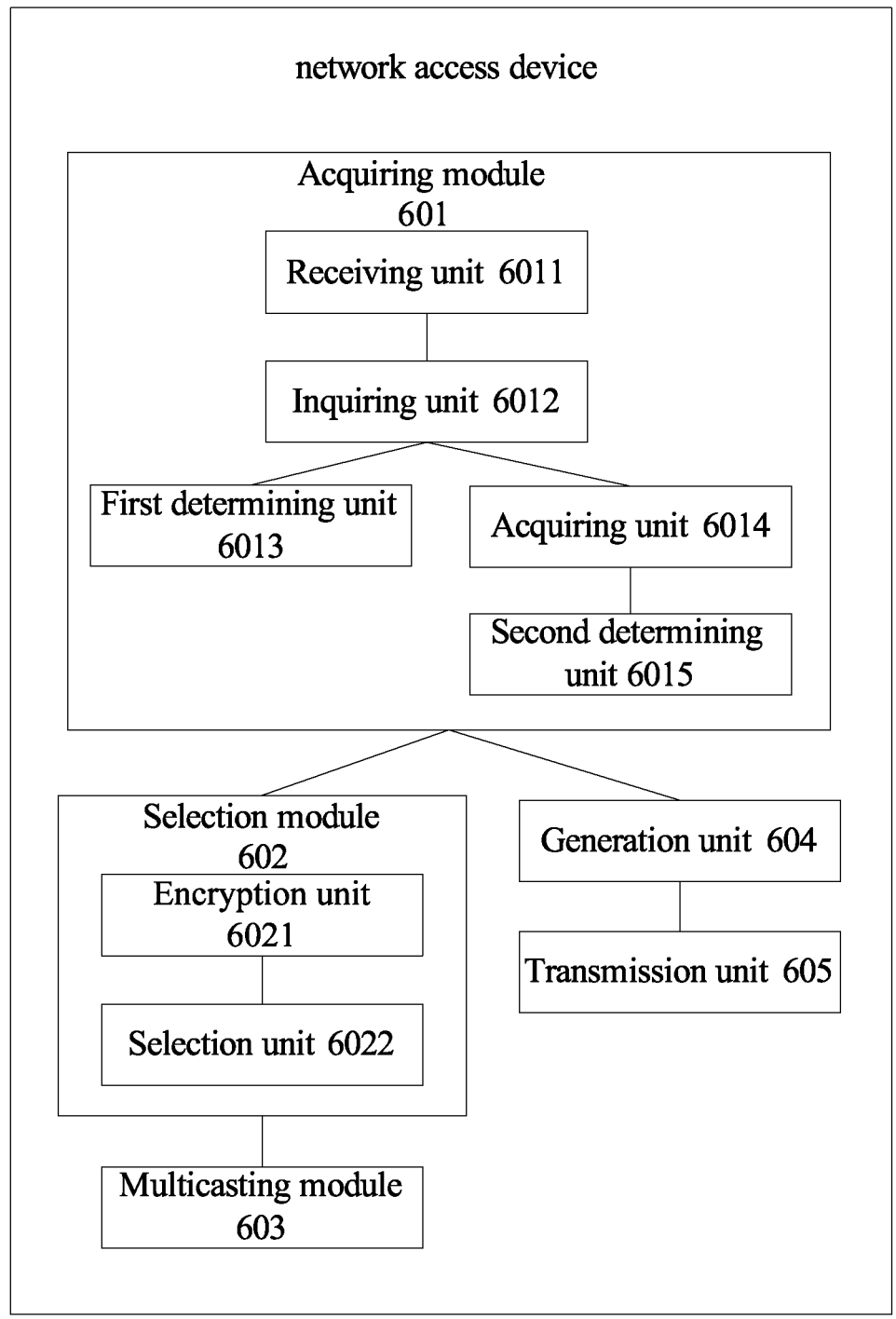
FIG. 6 is a block diagram illustrating an apparatus for accessing a network, according to an exemplary embodiment.

Corresponding to the method for accessing the network provided in the above exemplary embodiments, another exemplary embodiment of the present disclosure provides an apparatus for accessing the network. Referring to FIG. 6, the apparatus includes the components as follows.

A first acquiring module 601 is configured to acquire access information instructing a second terminal to access the network, the access information including a service set identifier (SSID) and an access password.

A selection module 602 is configured to select a plurality of destination addresses including the access information from a designated multicast address segment.

A multicasting module 603 is configured to multicast a plurality of user datagram protocol UDP multicast messages to the second terminal in accordance with the plurality of destination addresses.

Herein, the first acquiring module 601 includes the following components. A receiving unit 6011 is configured to receive the SSID of the selected network access device which the second terminal is instructed to access. An inquiring unit 6012 is configured to inquire whether an access password corresponding to the SSID is locally stored. A first determining unit 6013 is configured to determine the SSID and the access password corresponding to the SSID as the access information instructing the second terminal to access the network, if the access password corresponding to the SSID is stored.

The first acquiring module 601 further includes the following components. An acquiring unit 6014 is configured to acquire an inputted access password corresponding to the SSID, if the access password corresponding to the SSID is not locally stored. A second determining unit 6015 is configured to determine the SSID and the inputted access password corresponding to the SSID as the access information instructing the second terminal to access the network.

The selection module 602 includes the following components. An encryption unit 6021 is configured to encrypt the access information according to a preset encryption algorithm, and obtaining a transfer ciphertext corresponding to the access information. A selection unit 6022 is configured to select the plurality of destination addresses including the transfer ciphertext from the designated multicast address segment, according to the transfer ciphertext.

The apparatus further includes the flowing components. A generation unit 604 is configured to generate an indicating message based on the access information. The indicating message may include information on the access information. A transmission unit 605 is configured to transmit the indicating message to the currently accessed network access device, such that the network access device performs the steps of selecting the plurality of destination addresses including the access information from the designated multicast address segment based on the indicating message and multicasting the plurality of UDP multicast messages to the second terminal in accordance with the plurality of destination addresses.

In the embodiment of the present embodiment, the first terminal stores the access information instructing the second terminal to access the network into a plurality of multicast addresses including the access information, and transmits it to the second terminal by multicasting. A convenient access to the network by the second terminal is realized, thereby avoiding the defect of low human-computer interactivity due to complex operations, thus increasing network access efficiency.

Figure 7:
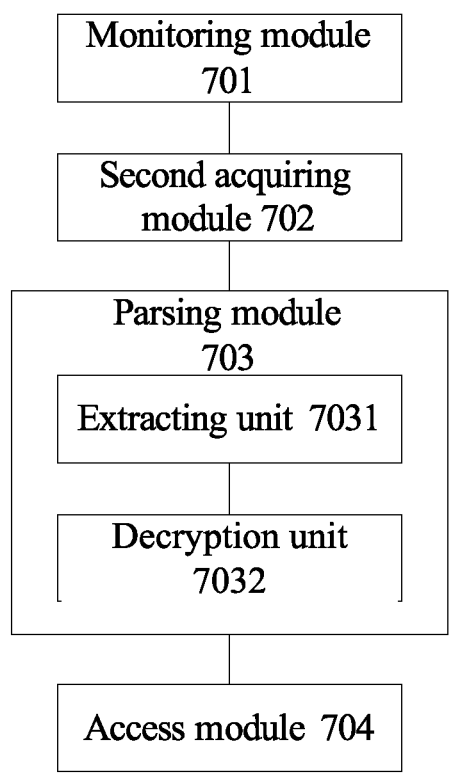
FIG. 7 is a block diagram illustrating an apparatus for accessing a network, according to an exemplary embodiment.

Corresponding to the method for accessing the network provided in the above exemplary embodiments, another exemplary embodiment of the present disclosure provides an apparatus for accessing the network. Referring to FIG. 7, the apparatus includes the components as follows.

A monitoring module 701 is configured to monitor a designated multicast address segment. A second acquiring module 702 is configured to acquire a destination address of each UDP multicast message if a plurality of UDP multicast messages are received for the designated multicast address segment.

A parsing module 703 is configured to parse the acquired destination address of each UDP multicast message to obtain access information. The access information includes an SSID and an access password.

An access module 704 is configured to perform a process of accessing the network access device corresponding to the SSID based on the SSID and the access password.

Herein, the parsing module 703 includes the following components. An extracting unit 7031 is configured to extract a transfer ciphertext corresponding to the access information based on the acquired destination address of each UDP multicast message. A decryption unit 7032 is configured to decrypt the transfer ciphertext according to a preset decryption algorithm, and restore the access information.

In the embodiment of the present disclosure, the second terminal monitors the designated multicast address segment, restores the access information according to the field of the multicast address of each multicast message after receiving the plurality of multicast message from the designated multicast address segment, and performs the operation of accessing the network according to the access information. A convenient access to the network by the second terminal is realized, thereby avoiding the defect of low human-computer interactivity due to complex operations, thus increasing network access efficiency.

Figure 8:
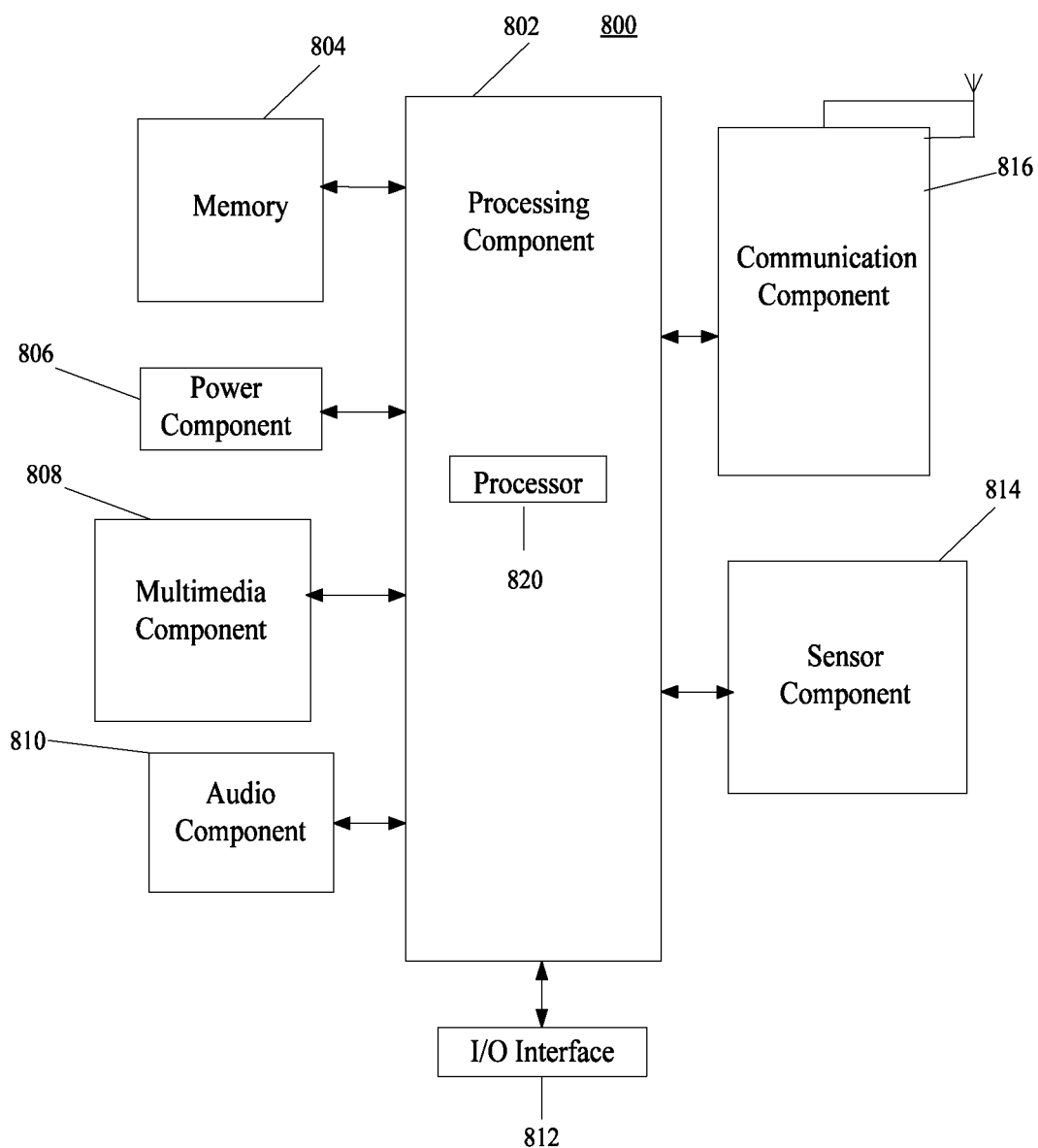
FIG. 8 is a block diagram of an apparatus for accessing a network, according to an exemplary embodiment, which shows a general structure of a terminal.

Corresponding to the method for accessing the network provided in the above exemplary embodiments, another exemplary embodiment of the present disclosure provides an apparatus 800 for accessing the network, referring to FIG. 8. The apparatus 800 in the present embodiment is the first terminal in the method for accessing the network provided by the above exemplary embodiments.

FIG. 8 is a block diagram of a device 800 for accessing a network, according to an exemplary embodiment. For example, the device 800 may be a mobile phone, a computer, a digital broadcast terminal, a messaging device, a gaming console, a tablet, a medical device, an exercise equipment, a personal digital assistant, and the like.

Referring to FIG. 8, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 804, executable by the processor 820 in the device 800, for performing the above-described methods. For example, the non-transitory computer-readable storage medium may be a ROM, a RAM, a CD-ROM, a magnetic tape, a floppy disc, an optical data storage device, and the like.

In the embodiment of the present disclosure, the first terminal stores the access information instructing the second terminal to access the network into a plurality of multicast addresses including the access information, and transmits it to the second terminal by multicasting. A convenient access to the network by the second terminal is realized, thereby avoiding the defect of low human-computer interactivity due to complex operations, thus increasing network access efficiency.

Figure 9:
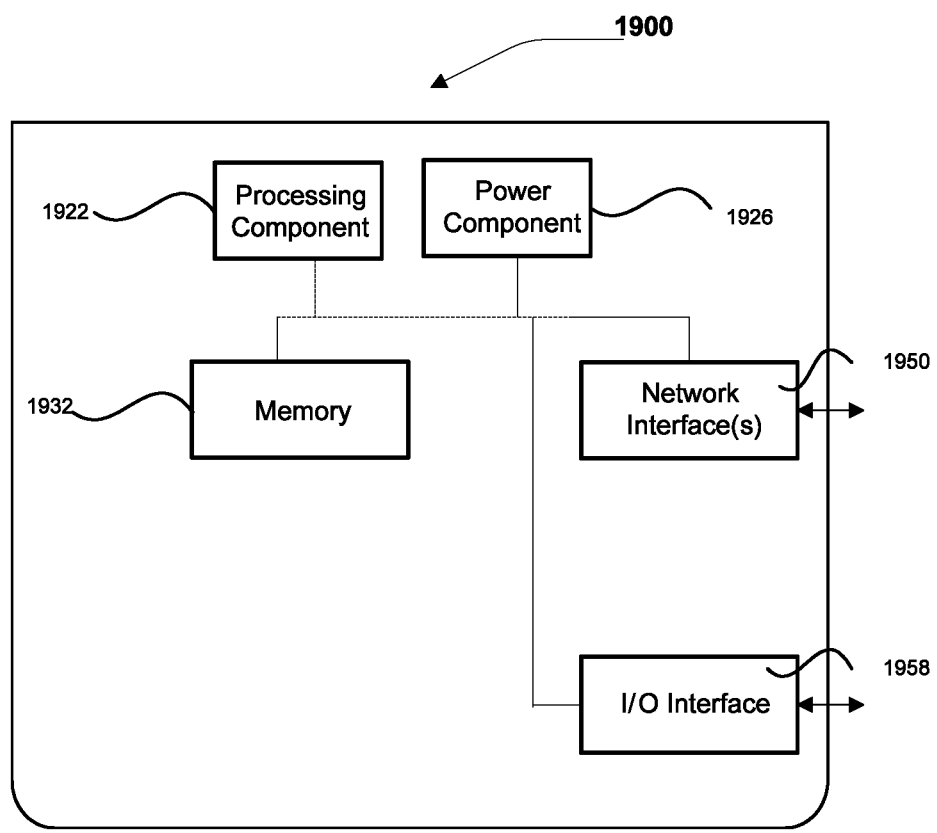
FIG. 9 is a block diagram of an apparatus for accessing a network, according to an exemplary embodiment, which shows a general structure of a network access device.

FIG. 9 is a block diagram of a device 1900 for accessing a network, according to an exemplary embodiment. For example, the device 1900 may be provided as a network access device. Referring to FIG. 9, the device 1900 includes a processing component 1922 that further includes one or more processors, and memory resources represented by a memory 1932 for storing instructions executable by the processing component 1922, such as application programs. The application programs stored in the memory 1932 may include one or more modules each corresponding to a set of instructions. Further, the processing component 1922 is configured to execute the instructions to perform the above described method for accessing the network.

The device 1900 may also include a power component 1926 configured to perform power management of the device 1900, wired or wireless network interface(s) 1950 configured to connect the device 1900 to a network, and an input/output (I/O) interface 1958. The device 1900 may operate based on an operating system stored in the memory 1932, such as Windows Server™, Mac OS X™, Unix™, Linux™, FreeBSD™, or the like.

In the embodiment of the present disclosure, the first terminal stores the access information instructing the second terminal to access the network into a plurality of multicast addresses including the access information, and transmits it to the second terminal by multicasting. A convenient access to the network by the second terminal is realized, thereby avoiding the defect of low human-computer interactivity due to complex operations, thus increasing network access efficiency.

Figure 10:
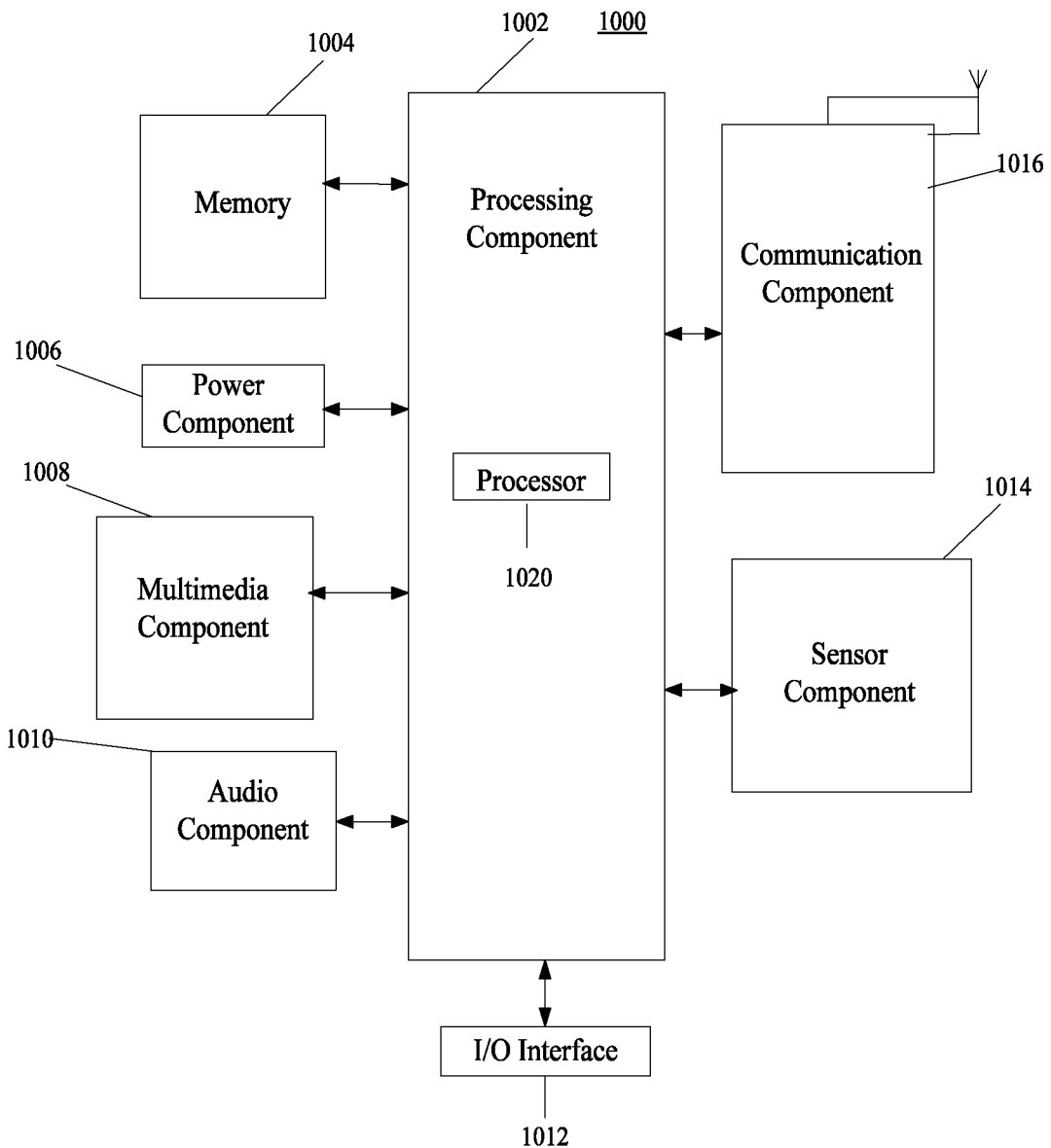
FIG. 10 is a block diagram of an apparatus for accessing a network, according to an exemplary embodiment, which shows a general structure of a terminal.

Referring to FIG. 10, corresponding to the method for accessing the network provided in the above exemplary embodiments, another exemplary embodiment of the present disclosure provides a device 1000 for accessing a network. FIG. 10 is a block diagram of a device 1000 for accessing a network, according to an exemplary embodiment. For example, the device 1000 may be a mobile phone, a computer, a digital broadcast terminal, a messaging device, a gaming console, a tablet, a medical device, an exercise equipment, a personal digital assistant, and the like.

Referring to FIG. 10, the device 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls overall operations of the device 1000, such as the operations associated with display, telephone calls, data communications, camera operations, and recording operations. The processing component 1002 may include one or more processors 1020 to execute instructions to perform all or part of the steps in the above described methods. Moreover, the processing component 1002 may include one or more modules which facilitate the interaction between the processing component 1002 and other components. For instance, the processing component 1002 may include a multimedia module to facilitate the interaction between the multimedia component 1008 and the processing component 1002.

The memory 1004 is configured to store various types of data to support the operation of the device 1000. Examples of such data include instructions for any applications or methods operated on the device 1000, contact data, phonebook data, messages, pictures, video, etc. The memory 1004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the device 1000. The power component 1006 may include a power management system, one or more power sources, and any other components associated with the generation, management, and distribution of power in the device 1000.

The multimedia component 1008 includes a screen providing an output interface between the device 1000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1008 includes a front camera and/or a rear camera. The front camera and the rear camera may receive an external multimedia datum while the device 1000 is in an operation mode, such as a photographing mode or a video mode. Each of the front camera and the rear camera may be a fixed optical lens system or have focus and optical zoom capability.

The audio component 1010 is configured to output and/or input audio signals. For example, the audio component 1010 includes a microphone ("MIC") configured to receive an external audio signal when the device 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker to output audio signals.

The I/O interface 1012 provides an interface between the processing component 1002 and peripheral interface modules, such as a keyboard, a click wheel, buttons, and the like. The buttons may include, but are not limited to, a home button, a volume button, a starting button, and a locking button.

The sensor component 1014 includes one or more sensors to provide status assessments of various aspects of the device 1000. For instance, the sensor component 1014 may detect an open/closed status of the device 1000, relative positioning of components, e.g., the display and the keypad, of the device 1000, a change in position of the device 1000 or a component of the device 1000, a presence or absence of user contact with the device 1000, an orientation or an acceleration/deceleration of the device 1000, and a change in temperature of the device 1000. The sensor component 1014 may include a proximity sensor configured to detect the presence of nearby objects without any physical contact. The sensor component 1014 may also include a light sensor, such as a CMOS or CCD image sensor, for use in imaging applications. In some embodiments, the sensor component 1014 may also include an accelerometer sensor, a gyroscope sensor, a magnetic sensor, a pressure sensor, or a temperature sensor.

The communication component 1016 is configured to facilitate communication, wired or wirelessly, between the device 1000 and other devices. The device 1000 can access a wireless network based on a communication standard, such as WiFi, 2G, or 3G, or a combination thereof. In one exemplary embodiment, the communication component 1016 receives a broadcast signal or broadcast associated information from an external broadcast management system via a broadcast channel. In one exemplary embodiment, the communication component 1016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1004, executable by the processor 1020 in the device 1000, for performing the above-described methods. For example, the non-transitory computer-readable storage medium may be a ROM, a RAM, a CD-ROM, a magnetic tape, a floppy disc, an optical data storage device, and the like.

In the embodiment of the present disclosure, the second terminal monitors the designated multicast address segment, restores the access information according to the field of the multicast address of each multicast message after receiving the plurality of multicast message from the designated multicast address segment, and performs the operation of accessing the network according to the access information. A convenient access to the network by the second terminal is realized, thereby avoiding the defect of low human-computer interactivity due to complex operations, thus increasing network access efficiency.

Other embodiments of the present disclosure will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for providing access information for accessing a network device from a first terminal to a second terminal, comprising:
    obtaining, by the first terminal, access information instructing a second terminal to access the network device, the access information comprising a service set identifier (SSID) and a password for the network device;
    dividing, by the first terminal, the access information into a plurality of data units;
    selecting, by the first terminal, a plurality of destination addresses comprising the access information from a designated multicast address segment associated with the first terminal, the plurality of the data units being included into the plurality of the destination addresses respectively; and
    multicasting, by the first terminal, a plurality of user datagram protocol (UDP) multicast messages including the plurality of the destination addresses to the second terminal.

2. The method of claim 1, wherein the selecting the plurality of the destination addresses comprising the access information from the designated multicast address segment comprises:
    encrypting the access information based on a preset encryption algorithm to obtain a transfer ciphertext corresponding to the access information;
    dividing the transfer ciphertext into a plurality of data units and adding the plurality of the data units to the plurality of the destination addresses; and
    selecting the plurality of the destination addresses comprising the transfer ciphertext from the designated multicast address segment.

3. The method of claim 2, wherein the plurality of the destination addresses include a length of the transfer ciphertext.

4. The method of claim 1 further comprising:
    generating, by the first terminal, an indicating message related to the access information; and
    transmitting the indicating message to the network device accessed by the first terminal, such that the network device performs the steps of selecting the plurality of the destination addresses comprising the access information from the designated multicast address segment based on the indicating message and multicasting the plurality of the UDP multicast messages including the plurality of the destination addresses to the second terminal.

5. A method for providing access information for accessing a network device from a first terminal to a second terminal, comprising:
    obtaining, by the first terminal, access information instructing a second terminal to access the network device, the access information comprising a service set identifier (SSID) and a password for the network device;
    dividing, by the first terminal, the access information into a plurality of data units;
    selecting, by the first terminal, a plurality of destination addresses comprising the access information from a designated multicast address segment associated with the first terminal, the plurality of the data units being included into the plurality of the destination addresses respectively; and multicasting, by the first terminal, a plurality of user datagram protocol (UDP) multicast messages including the plurality of the destination addresses to the second terminal, wherein the obtaining the access information instructing the second terminal to access the network device comprises:

receiving the SSID of the network device which the second terminal is instructed to access;

determining whether an access password corresponding to the SSID is stored in the first terminal; and obtaining the SSID and the access password when the access password corresponding to the SSID is stored in the first terminal.

6. The method of claim 5, wherein the obtaining the access information instructing the second terminal to access the network device comprises:

receiving an access password corresponding to the SSID from a user of the first terminal, when the access password corresponding to the SSID is not stored in the first terminal; and obtaining the SSID and the received access password corresponding to the SSID.

7. An apparatus for providing access information for accessing a network device to a terminal, comprising:

a processor; and a memory for storing instructions executable by the processor, wherein the processor is configured to cause the apparatus to:

obtain the access information instructing the terminal to access the network device, the access information comprising a SSID and an access password for the network device;

divide the access information into a plurality of data units;

select a plurality of destination addresses comprising the access information from a designated multicast address segment, the plurality of the data units being included into the plurality of the destination addresses; and multicast a plurality of UDP multicast messages including the plurality of the destination addresses to the terminal.

8. The apparatus of claim 7, wherein, when the processor is configured to cause the apparatus to select the plurality of the destination addresses comprising the access information from the designated multicast address segment, the processor is configured to cause the apparatus to:

encrypt the access information based on a preset encryption algorithm to obtain a transfer ciphertext corresponding to the access information;

divide the transfer ciphertext into a plurality of data units and adding the plurality of the data units to the plurality of the destination addresses; and select the plurality of the destination addresses comprising the transfer ciphertext from the designated multicast address segment.

9. The apparatus of claim 8, wherein the plurality of the destination addresses include a data amount of the transfer ciphertext.

10. The apparatus of claim 7, wherein the processor is further configured to cause the apparatus to:

generate an indicating message related to the access information; and transmit the indicating message to the network device accessed by the apparatus, such that the network device performs the steps of selecting the plurality of the destination addresses comprising the access information from the designated multicast address segment based on the indicating message and multicasting the plurality of the UDP multicast messages including the plurality of the destination addresses to the terminal.

11. An apparatus for providing access information for accessing a network device to a terminal, comprising:

a processor; and a memory for storing instructions executable by the processor, wherein the processor is configured to cause the apparatus to:

obtain the access information instructing the terminal to access the network device, the access information comprising a SSID and an access password for the network device;

divide the access information into a plurality of data units;

select a plurality of destination addresses comprising the access information from a designated multicast address segment, the plurality of the data units being included into the plurality of the destination addresses; and multicast a plurality of UDP multicast messages including the plurality of the destination addresses to the terminal, wherein, when the processor is configured to cause the apparatus to obtain access information instructing the terminal to access the network device, the processor is configured to cause the apparatus to:

receive the SSID of the network device which the terminal is instructed to access;

determine whether an access password corresponding to the SSID is stored in the apparatus; and obtain the SSID and the access password corresponding to the SSID as the access information instructing the terminal to access the network device, when the access password corresponding to the SSID is stored in the apparatus.

12. The apparatus of claim 11, wherein, when the processor is configured to cause the apparatus to obtain access information instructing the terminal to access the network device, the processor is further configured to cause the apparatus to:

receive the access password corresponding to the SSID, when the access password corresponding to the SSID is not stored in the apparatus; and obtain the SSID and the received access password corresponding to the SSID as the access information instructing the terminal to access the network device.

* * * * *